Patented July 7, 1953

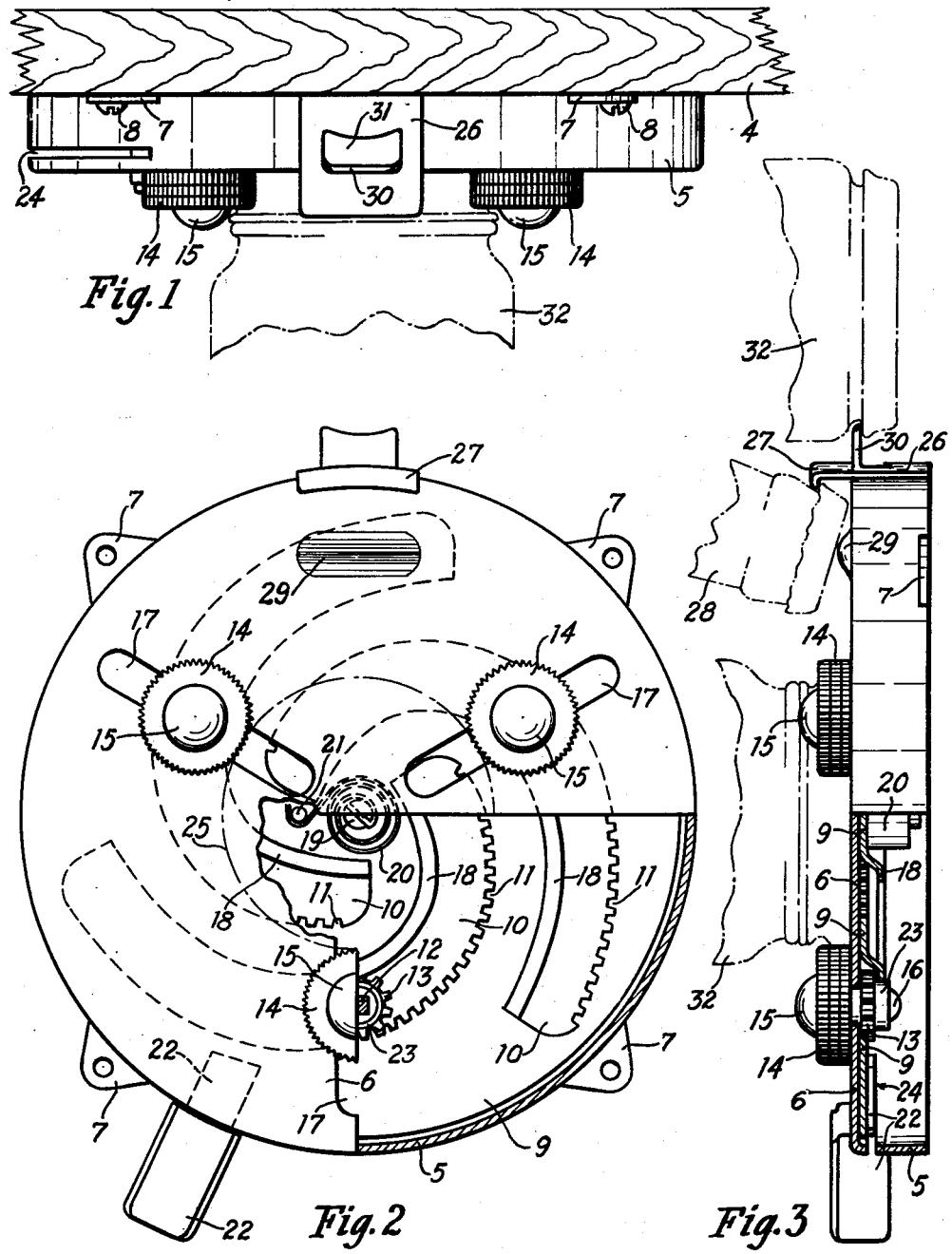

2,644,354

UNITED STATES PATENT OFFICE 2,644,354

CLOSURE REMOVER WITH JAW WHEELS CONTROLLED BY INTERSECTING CAM AND RADIAL SLOTS

Harold J. Schlageter, Bremerton, Wash.

Application November 14, 1947, Serial No. 785,916

1 Claim. (Cl. 81—3.3)

My invention relates to a container cap remover. More particularly my invention relates to a device for removing caps from various containers and more especially to containers, such as fruit jars, having screw caps or lids held by screw type rings. Thus for purposes of illustration and not by way of limitation, such containers will be hereinafter referred to as jars having screw type lids. Examples of such jars having screw type lids are commonly sold on the market as "Kerr" or "Mason" jars. Furthermore, my device provides means to remove caps from bottles, such as the beer bottle type, or caps from the type of jars having lids known as "anchor" type lids.

Another object of my invention is to provide a jar cap remover wherein a screw type lid on a jar is engaged at a plurality of locations so as to evenly distribute the pressure incident to engaging the jar lid for removal thereof.

Another object of my invention is to provide a device which may be permanently supported by a horizontal surface, such as the underside of a cupboard, and which may be opened to receive a jar lid and to sustain a jar so that a housewife will have two hands to engage the jar and turn the same to thus remove the lid.

Another object of my invention is to provide means which will tighten against the lid with increasing pressure on the jar and thus eliminate any possibility of slippage between the jar cap and the cap remover.

Another object of my invention is to provide a device which is economical in construction, substantially fool proof in operation and one in which a jar cap may be readily and rapidly inserted to be removed from the jar.

Another object of my invention is to provide a device which will remove jar caps regardless of the diameter thereof.

The above mentioned general objects of my invention together with others inherent in the same are attained by the device illustrated in the accompanying drawings, throughout which like reference numerals indicate like parts.

Figure 1 is a view in elevation of a device embodying my invention and showing a fragment of a supporting means therefor and a fragment, in dot and dash lines, of a jar in position to have its screw type lid removed;

Figure 2 is a bottom plan view, with parts broken away, of the structure shown in Figure 1, except that the supporting means of Figure 1 has been removed, the jar shown by dot and dash lines shown in Figure 1 has been removed, and the jar lid is indicated by a fragment of a circle shown in dot and dash lines; and Figure 3 is a view in elevation, with parts broken away and with parts in section, taken substantially at 90° to Figure 1, and showing by dot and dash lines: a fragment of a screw type jar with a lid thereon, a fragment of a bottle in place to have its cap removed, and a fragment of a jar having an "anchor" lid thereon in place to have its cap removed.

Referring now to Figure 1 of the drawings, my device is preferably mounted on the underside of a cabinet or shelf, a fragment of which is indicated by 4. A case comprising a cylindrical side wall 5 and a bottom plate 6 is provided with a plurality of ears 7. Each of the ears 7 has an opening therein to receive a screw 8 so that the case 5—6 and parts connected therewith may be rigidly secured in place and supported by the fragment 4. These ears 7 are rigid with the case 5—6 and in normal construction will be punched out of the side walls 5. In the interest of clarity, the fragment 4 and screws 8 have been omitted from Figures 2 and 3 of the drawings.

The plate 9 is mounted for rotary movement in the case 5—6 as will be hereinafter explained. The plate 9 is provided with a plurality of helical tracks 10 and in the drawings three thereof are illustrated. Each of the helical tracks 10 is provided at one edge thereof with teeth 11 to provide a rack.

A plurality of shafts 12 are provided and each thereof rigidly carries a gear 13. Also each shaft 12 rigidly carries a lid engaging knurled wheel 14. A guide roll 23 is rotatably mounted on each shaft 12. The several parts on each shaft 12 are prevented from moving lengthwise thereof, as by head portions 15 and 16. The shafts 12 are mounted to move radially in slots 17 in the bottom plate 6. In this movement each wheel 14 slidingly engages one face of the plate 6 and its associated gear 13 slidingly engages the other surface of said plate 6.

Each gear 13 is mounted in its track 10 to engage the teeth 11 thereof. A helical raised portion 18 is associated with each of the helical tracks 10 and overlies the gear 13 to retain the gear 13 between said raised portion 18 and the bottom plate 6. Obviously, the helical raised portions 18 may be separate plates superposed above plate 9 or the same may be raised portions stamped out of the plate 9. The rolls 23 ride against the outer edge of the raised portions 18 and maintain the gears 13 in contact with teeth 11.

From this construction it will be obvious that each assembly, comprising a shaft 12, roll 23, a gear 13, and knurled wheel 14, may be moved radially in slots 17 if the plate 9 and the associated helical tracks 10 are moved in a counterclockwise direction as respects the showing in Figure 2 of the drawings. In other words, each gear 13 will rotate as its track 10 and teeth 11 move relative to the gear 13. The shafts 12 have a radial movement by reason of slots 17. Thus the shafts 12 and wheels 14 thereon will move radially in response to counterclockwise movement (as respects the showing in Figure 2) of the plate 9. Means to move the plate 9 in the desired direction, as counterclockwise in Figure 2, comprise a shaft 19 rigidly secured to the plate 6. The shaft 19 rotatively supports plate 9. Preferably the plate 9 need only be urged in one direction, as counterclockwise in Figure 2 and returns underspring pressure to a normal position. Means to accomplish this purpose comprise a coiled spring 20 having one end rigid with the shaft 19 and the other end secured to the plate 9 which may comprise a pin 21 rigid with said plate 9.

A convenient means for turning plate 9 comprises a handle 22 which is rigidly connected with plate 9. A slot 24 in side wall 5 permits the handle 22 to extend within the case 5—6 to engage plate 9 and have an external portion which can be readily engaged. The slot 24 is of suitable length, such as 180°, so as to provide for suitable travel of the plate 9 and in turn suitable radial movement of the knurled wheels 14.

As the plate 9 moves relative to the shafts 12, the said shafts 12 will move radially. After the plate 9 has been moved an appropriate distance in a counterclockwise direction, the wheels 14 will be sufficiently radially spaced so that a jar lid 25 can be disposed between the same. Then upon release of the plate 9, the spring 20 will cause plate 9 to move in a clockwise direction and the wheels 14 will engage with the jar lid. Of course if spring 20 is not employed, the plate 9 may be manually moved clockwise. As viewed in Figure 2 of the drawings, a jar will be rotated in a counterclockwise direction to unscrew the jar from the lid. Thus the jar lid, indicated by dot and dash line 25 in Figure 2, will tend to move in a counterclockwise direction. This will tend to cause wheels 14 to move in a clockwise direction by reason of friction between them and the lid. As the wheels 14 tend to move in a clockwise direction similarly the gears 13 tend to move in a clockwise direction and also radially inwardly. Due to the presence of the jar lid between the wheels 14, the wheels 14 cannot move inwardly. Thus the jar lid is locked between the knurled wheels 14 and the greater the rotary pressure that is applied on the jar to remove the same from the lid, the greater will be the pressure of the wheels 14 against the jar lid to hold it against turning. Putting the matter another way, if a jar and jar lid are turned in a counterclockwise direction, the jar lid will tend to cause the knurled wheels 14 to move clockwise. This causes shaft 12 (which is rigid with knurled wheels 14) tend to move in a clockwise direction. As each shaft 12 rigidly carries a gear 13, the gear 13 in turning causes the plate 9 to move clockwise and thus moves the shafts 12 radially inwardly. Preferably I thus employ gears 13 and teeth 11 to thus provide positive movement of the plate 9 upon rotary movement in a clockwise direction of the wheels 14. However, satisfactory results can be obtained by providing a knurled surface rather than the teeth 11 and a wheel with a knurled surface thereon in place of the gear 13. The teeth 11 are in effect a spiral rack and each gear 13 is in effect the pinion for such rack.

Obviously if the plate 9 is provided with any suitable means so it is held, then if case 5—6 is rotated we will have the same action. Thus relative movement between said parts is all that is needed. Thus if plate 9 is held it will function as the case member and 5—6 as the plate member. Also the spiral tracks 10 may be in the held member or the movable member and likewise the radial slots 17 may be in the held member or the movable member. Case 5—6 thus constitutes a plate member and plate 9 constitutes another.

Preferably a plate 26 is carried by the case 5—6 and terminates in a beer bottle type cap engaging member 27. Thus a beer bottle type bottle 28 can be readily decapped by the member 27. If desired a raised portion 29 in the plate 6 may be employed so that the member 27 will more readily engage the cap on the bottle 28.

Preferably a portion of the plate 26 is stamped out to provide the protruding portion 30 which will thus leave the opening 31. Such protruding portion 30 is useful for removing "anchor" type lids from a jar 32 carrying the same.

Obviously, the means for removing caps from bottles 28 and jars 32 are auxiliary and are employed to provide an all-purpose unit. Primarily my invention relates to a construction for removing screw type lids from jars which are illustrated by the fragment of a jar 32 shown in Figures 1 and 3, the lid of which is illustrated by the fragment of a circle 25 in Figure 2.

In the foregoing and in the appended claim the slots 17 are referred to as radial slots. Preferably such slots follow a true radius but not necessarily. It is to be understood that such term also includes slots which extend toward the center whether or not a true radius is followed.

Obviously, changes may be made in the forms, dimensions, and arrangements of the parts of my invention, the above setting forth only a preferred form of embodiment.

I claim:

A device for removing screw type lids from jars or the like comprising a case member having three radial slots therein; case member mounting means connected with said case member for mounting the same on a fixed support; a plate member disposed adjacent said case member, mounted for rotary movement as respects said case member, and provided with three helical slots which respectively intersect the said radial slots; a rack disposed on similar edge portions of each helical slot; shaft means mounted for rotary and radial movements in each of said radial slots; pinion means rigidly carried by each of said shaft means and each meshing with one of said racks, whereby said shaft means may move radially in said radial slots upon relative movement between said case and plate members; spring means urging said plate member in a direction to move said shaft means radially inwardly; handle means connected with said plate member, projecting outwardly of said case member, for urging said plate member in a direction opposite to that urged by said spring means; and wheel lid engaging means carried by each of said shaft means, whereby said wheel lid engaging means may be moved radially outwardly by said handle means and a jar lid disposed therebetween, said wheel lid engaging means will move radially inwardly and against said lid under the influence of said spring means, and said lid engaging means will tighten upon said lid upon relative angular movement in one direction between the lid and said wheel lid engaging means.

HAROLD J. SCHLAGETER.

References Cited in the file of this patent

UNITED STATES PATENTS

| Number | Name | Date |
|---|---|---|
| 1,394,388 | Wisenberg et al. | Oct. 18, 1921 |
| 1,488,221 | Swissgabel | Mar. 25, 1924 |
| 1,705,582 | May | Mar. 19, 1929 |
| 2,495,004 | Hauck | Jan. 17, 1950 |

FOREIGN PATENTS

| Number | Country | Date |
|---|---|---|
| 323,578 | Germany | July 28, 1920 |